June 2, 1925.  
R. L. ANDERSON  
HEADLIGHT DEFLECTOR  
Filed March 14, 1924  
1,540,673  
2 Sheets-Sheet 1
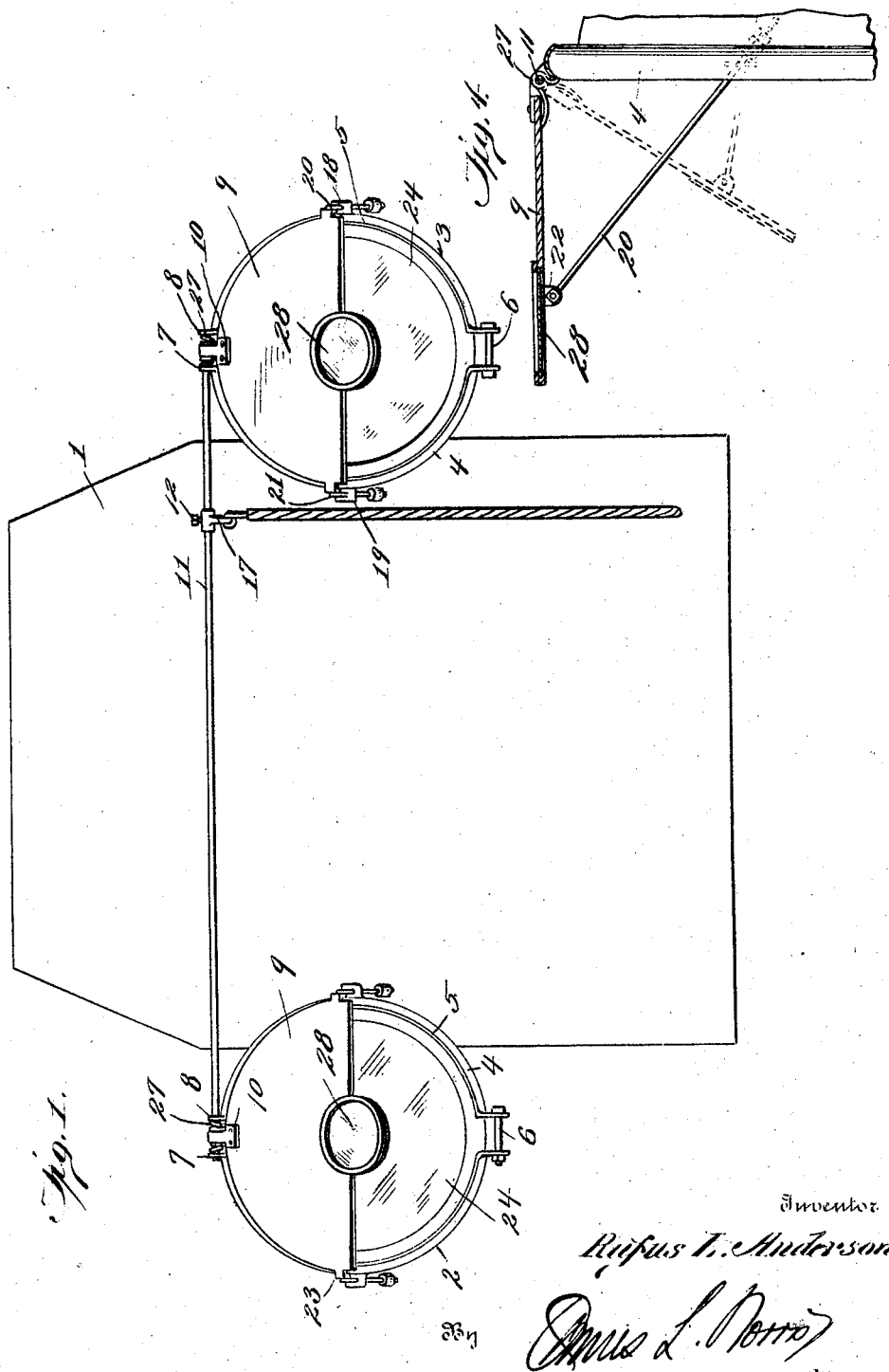

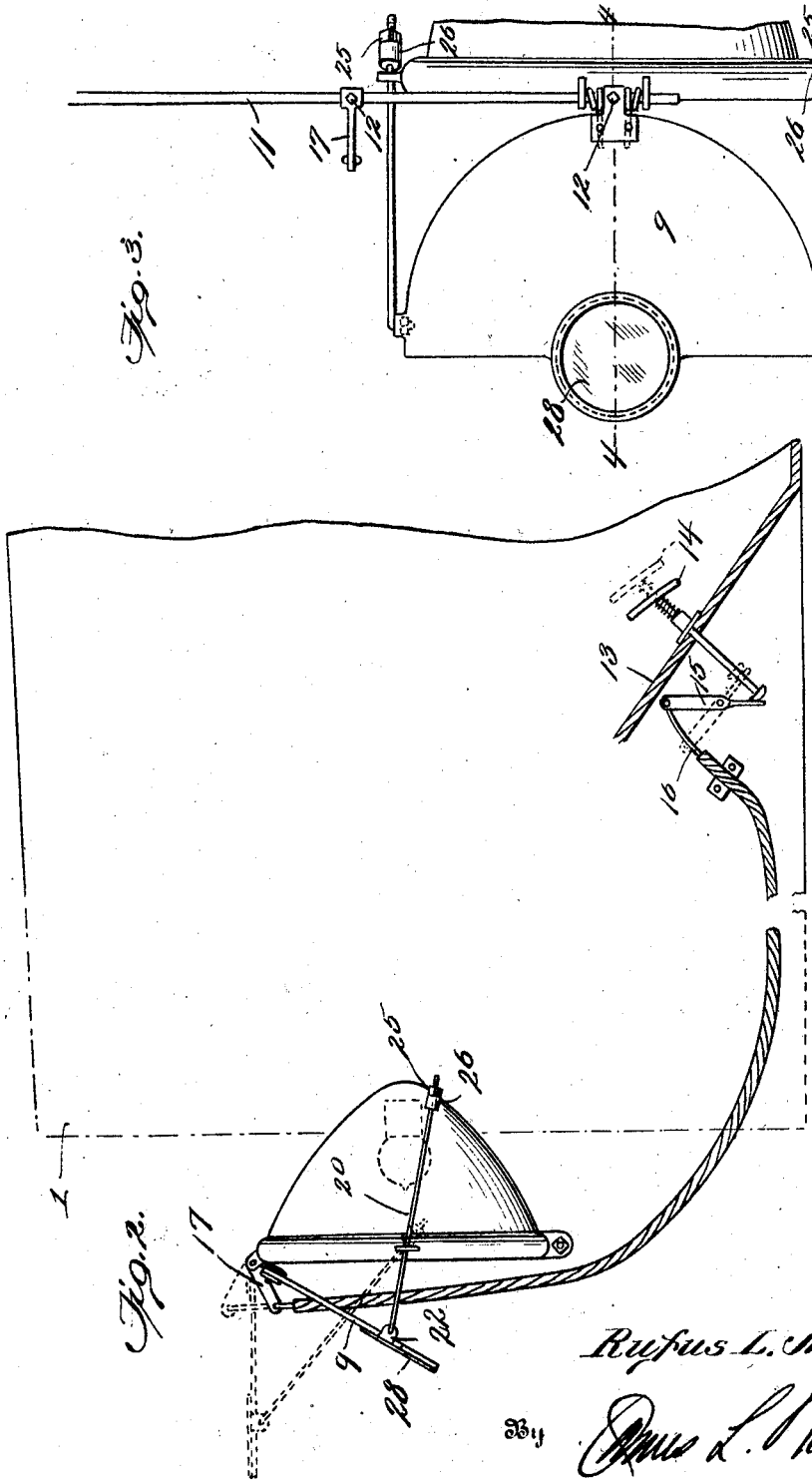

Patented June 2, 1925.

1,540,673

UNITED STATES PATENT OFFICE.

RUFUS L. ANDERSON, OF ORLANDO, FLORIDA.

HEADLIGHT DEFLECTOR.

Application filed March 14, 1924. Serial No. 699,275.

*To all whom it may concern:*

Be it known that I, RUFUS L. ANDERSON, a citizen of the United States, residing at Orlando, in the county of Orange and State of Florida, have invented new and useful Improvements in Headlight Deflectors, of which the following is a specification.

This invention relates to deflectors for headlights and proposes the construction of means normally out of the path of the beam of light emanating from headlight lens and movable at the will of the driver of the automobile or other vehicle upon which the headlights may be mounted, to a position in which the upper part of the beam is deflected toward the roadway, avoiding the projection of blinding rays into the eyes of an approaching driver.

Another object of the invention is the provision of a transparent member carried by the light-deflecting means and so located as to lie in the path of rays emerging directly from the bulb or other source of light when the deflector is in light-deflecting position.

Still another object of the invention resides in means for adjusting the deflector for the purpose of predetermining its range of movement.

Another object of the invention relates to the novel disposition and construction of means for operating the deflector.

With the above and other objects in view, my invention consists in the improved headlight deflector illustrated in the accompanying drawings, described in the following specification, and particularly claimed, and in such variations and modifications thereof as will be obvious to those skilled in the art to which my invention relates.

In the drawings accompanying and forming a part of this specification, and wherein the preferred embodiment of my invention is illustrated:

Figure 1 is a front elevation showing my improved deflector for headlights in light-deflecting position.

Figure 2 is a side elevation of the same, also indicating by dotted lines the normal open position of the deflector.

Figure 3 is a plan view of one of the deflectors when in open position.

Figure 4 is a section taken through the line 4—4 of Figure 3.

Referring now in detail to the several figures, the numeral 1 represents more or less diagrammatically, the front of an automobile having the headlights 2 and 3 mounted at the opposite sides thereof in the usual position. In the illustrative embodiment of my invention the headlight deflectors are presumed to be applied to existing headlights in the form of an attachment. It is quite evident, however, that the spirit of the invention is not violated should the headlights be built especially with a view to receiving the deflectors, as will hereinafter appear.

The headlights as shown are formed with an ornamental roll rim 4, the same being the annular flange by means of which the lens 24 is held in place. The headlight deflector is attached to the roll rim by means of a channeled clamp 5 of a cross section shaped approximately to correspond to the curvature of the roll rim and having sufficient resiliency to permit it to be slipped over said rim and the ends thereof brought forcibly into juxta-position by means of the bolt and nut 6. The clamp 5 is formed at its upper portion with spaced lugs 7 and 8. Together, these form the female element of a hinge. The deflector proper consists of an opaque curtain 9 made of any appropriate material such as metal, and preferably shaped to conform to the peripheral edge of the headlight when closed and of sufficient extent to shaped substantially the upper half of the headlight lens. The deflector is provided at its upper part with the male hinge member 10, the latter being positioned between the lugs 7 and 8 and held in place by a rod 11 passed therethrough and through said lugs, said rod serving both as a pintle for the hinge and as an operating rod for both deflectors. The hinge member 10 is fixed to the rod 11 by any suitable means such as the set screw 12 so that when the rod is oscillated the deflectors will be operated. Normally the deflectors are held open, that is to say in a position parallel with the beam of light emanating from the lens of the headlight by springs 27 one form of which is shown in detail in Figure 4 and consists of a resilient wire bent around the rod 11 between the male and female members of the hinge and having the ends thereof engaging respectively the clamp 5 and the under surface of the deflector 9.

The rod 11 may be conveniently operated from the foot-board 13 of the auto vehicle by means of a pedal 14, pressure upon which oscillates the lever 15 pulling the Bowden wire 16, the latter in turn depressing a lever 17 which is fixed relative to the shaft 11, said lever oscillating said shaft to throw the deflectors 9 downward to an oblique or light-deflecting position. The under surfaces of the deflectors 9 are preferably silvered so that the deflected beam is not merely cut off but thrown to the roadway.

The clamp 5 may be provided on opposite sides with lugs 18 and 19 which are apertured to slidably receive the rods 20 and 21. Said rods are preferably pivotally attached at their outer ends to lugs 22 and 23 formed at opposite sides of the deflector. The object of these rods is to brace the deflector against lateral displacement and also to limit the range of the opening movement thereof. For the accomplishment of the latter function the free ends of the rods 20 are threaded for a considerable distance and provided with the stop nuts 25. A rubber buffer 26 is carried by each of the rods intermediate the nuts 25 and the lugs 18 and 19 of the clamp 5, the object of said buffer being to cushion the contact of the parts when the deflectors are suddenly opened and thus to prevent vibration or rattling. As it is desirable that some illumination should be directed distally of the automobile even when the deflectors are in light-deflecting position I have provided the deflectors with transparent portions 28 so located as to be in line with the rays of light passing out directly from the bulb or other source of illumination. These transparent portions may take the form of mere arcuate cut-outs in the deflector, or may be of clear or suitably colored membrane of glass or other light transmitting material, covered material being preferred, as it occludes the transmitted light sufficiently to render it free from objectionable glare.

In operation the deflectors are normally maintained in the position shown in full lines in Figure 4, lying parallel with the beam of light emerging from the lens of the headlight. When an approaching vehicle is encountered the operator presses upon the pedal 14 shown in Figure 2, actuating the lever 17 through the Bowden wire 16 and oscillating the rod 11 thereby depressing the deflectors to the dotted line position of Figure 4. The deflector then causes the upper part of the reflected beam to be thrown to the roadway, merely the directly transmitted rays from the bulb passing through the transparent portion 28. When it is desired again to outline the full illumination of the headlights the pedal is released permitting the springs 127 to return the deflectors to their normal open position. By taking up on the nuts 25 the positions of the deflectors when fully opened may be varied.

Although I have herein described deflectors for headlights which are adapted to be attached, as an accessory to headlights already in use, yet it is perfectly feasible under the terms of my invention to have it built in to the lamp structure when the lamp is manufactured. This may be done by making the female portion of the hinge and the lugs 18 and 19 a part of the lens retaining flange, or by riveting them thereto. It is also obvious that should the shape of the lamp be non-circular, the configuration of the deflectors may be so altered as to correspond thereto.

Obviously, changes in the details of construction may be made, without departing from the spirit of the invention and I do not wish to limit myself to any particular form or arrangement of parts.

Having described my invention what I claim as new and desire to secure by Letters Patent, is:—

1. A deflector for headlights of the type which include a reflector and a centrally located source of light, comprising a movable curtain normally positioned out of the path of the reflected beam of light emanating from the headlight, and means for tilting said deflector downwardly to a position obstructing the upper part of said reflected light beam, said curtain being constructed to terminate, when in operative position, substantially in a plane embracing the horizontal diameter of said lens, and a light transmitting inset carried by said curtain, said inset being substantially concentric with said lens when the curtain is in operative position, and extending above and below the terminal edge of said curtain.

2. A deflector for headlights of the type which include a reflector and a source of light, comprising an annular clamp embracing said headlight, a curtain hinged to the upper part of said clamp and normally positioned out of the path of the reflected beam of light emanating from the headlight, said clamp being provided with lateral guiding lugs, rods pivotally attached to opposite sides of said curtain and having their free ends passing through said guiding lugs and means for tilting said deflector downwardly to a position obstructing the upper part of said reflected light beam, said curtain being provided with a transparent portion to permit passage, when in light-deflecting position of directly transmitted rays from said source of light.

3. A deflector for headlights of the type which include a reflector and a source of light comprising an annular clamp embracing said headlight, a curtain hingedly mounted to the upper portion of said clamp and normally positioned out of the path of the reflected beam emanating from said headlight, said clamp being provided with lateral guiding lugs, rods pivotally attached to opposite sides of said curtain, the free ends of said rods passing through said lugs, nuts threadedly engaging said free ends and means for tilting said deflector downwardly to a position obstructing the upper part of said reflected light beam.

4. A deflector for headlights of the type which include a reflector and a source of light comprising an annular clamp embracing said headlight, a curtain hingedly mounted to the upper portion of said clamp and normally positioned out of the path of the reflected beam emanating from said headlight, said clamp being provided with lateral guiding lugs, rods pivotally attached to opposite sides of said curtain, the free ends of said rods passing through said lugs, nuts threadedly engaging said free ends, elastic buffers on said rods intermediate said nuts and said guiding lugs, and means for tilting said deflector downwardly to a position obstructing the upper part of said reflected light beam.

5. A deflector for headlights of the type which include a reflector and a source of light, comprising a curtain hingedly mounted at the top of said headlight and normally positioned out of the path of the reflected beam of light emanating therefrom, said lamp being also provided with lateral guiding lugs, rods pivotally attached at opposite sides of said curtains having the free ends thereof passing through said lugs, nuts threadedly engaging said free ends, elastic buffers on said rods intermediate said nuts and lugs and means for tilting said deflector downwardly to a position obstructing the upper part of said reflected light beam.

6. A deflector for headlights of the type which include a reflector and a source of light, comprising a curtain hingedly mounted at the top of said headlight and normally positioned out of the path of the reflected beam of light emanating therefrom, said lamp being also provided with lateral guiding lugs, rods pivotally attached at opposite sides of said curtains having the free ends thereof passing through said lugs, nuts threadedly engaging said free ends, elastic buffers on said rods intermediate said nuts and lugs, and pedal operated means for tilting said deflector downwardly to a position obstructing the upper part of said reflected light beam, said curtain being provided with a transparent portion constructed to permit passage, when in light-deflecting position of directly transmitted rays from said source of light.

In testimony whereof I have hereunto set my hand.

RUFUS L. ANDERSON.